3,300,852
METHOD FOR BONDING BERYLLIUM OXIDE
TO GRAPHITE
Henderikus Johannes de Bruin, Helensburg, New South Wales, Australia, assignor to the United States of America as represented by the United States Atomic Energy Commission
No Drawing. Filed Feb. 18, 1964, Ser. No. 345,811
3 Claims. (Cl. 29—472.7)

The present invention relates generally to a method for bonding a ceramic body to a graphite body and more particularly to a method for bonding beryllium oxide to graphite.

Various materials combine both high temperature structural properties and good nuclear properties and, as such, are highly useful in the nuclear field as construction materials. Also in related fields, such as in the missile and space industry, there is a need for materials which possess similar properties for use as structural components. Graphite, with its excellent moderator and reflector qualities and high temperature structural strength, is one of the most widely known of these materials. Beryllium oxide is another of these materials and, while it does not have as good structural properties as graphite, it is equally as good as a moderator or reflector with high utility. Inasmuch as both of these materials have good nuclear properties there is a general interest in finding an effective method for bonding the two materials together for use as reactor components, such as might be utilized in a hollow, cylindrical, graphite matrix uranium fuel element having a beryllium oxide spine disposed along the center of the fuel element. However, due to the large residual stresses being set up in the materials, satisfactory bonds between the two materials have not been obtainable. It is, therefore, the primary object of the present invention to provide a method for bonding a ceramic body to a graphite body, and a more specific object is to provide a method for bonding beryllium oxide to graphite.

Briefly, the present method comprises disposing a beryllium oxide body and a body of graphite having a randomly-oriented crystallographic structure in abutting relationship, interposing a thin layer of platinum metal therebetween, heating the abutting surfaces of the bodies in a vacuum to a temperature above 1550° C. but below 1773° C. for a sufficient length of time to cause diffusion of said platinum into said bodies thereby bonding the ceramic body to the graphite body and thereafter slowly cooling the bonded joint to ambient temperature.

Applicant has found that a strong metallurgical bond could be produced between beryllium oxide and nuclear-grade graphite, which has a randomly oriented crystallographic structure, by utilizing a thin layer of platinum metal to effect bonding between the two materials when heated to an elevated temperature for an extended period of time. As used herein the term "randomly oriented graphite" means graphite whose crystallographic structure is not highly oriented in a preferred direction, as is the case with pyrolytic graphite. It should be understood that the degree of "random orientation" is not critical and that a slight orientation, as ordinarily arises in the production of the material, as for example where it is extruded, is within the scope of the invention. However, it is desirable that any specific orientation, as might occur in the production of the material, be kept to a minimum.

Unlike a brazing process in which the melting point of the brazing alloy is exceeded to effect a strong bond, it is essential to the practicing of this invention that the temperature to which the materials to be joined are heated does not exceed the melting point of platinum, which is approximately 1773° C.; when the melting point was exceeded, inferior bonds were produced. This is thought to be attributable to the poor wetting properties between platinum and beryllium oxide, thus causing a considerable decrease of the contact area when the platinum melted and the beryllium oxide floated on top of the drop of liquid metal. Applicant has found that an optimum temperature range is from 1550° C. to 1650° C., preferably around 1650° C., with the lower temperature being a lower limit for a practical diffusion-reaction rate.

It has been found important to dry the beryllium oxide with respect to water before bonding, since the volatilization of beryllium oxide appears to be catalyzed by platinum in the presence of small amounts of water vapor at these elevated temperatures.

While it is to be understood that applicant does not wish to be bound by a rigid theory, it is thought that the prior art difficulties in obtaining a sound metallurgical joint between beryllium oxide and graphite resulted from the high residual stresses set up in the materials when highly oriented graphite, such as pyrolytic graphite, was used. As used herein the term "pyrolytic graphite" means graphite which is produced by the high temperature decomposition of hydrocarbons on a heated surface, and consists of highly oriented planes of graphite molecules stacked closely together in a laminar type structure. Applicant has found that by using graphite which has a *randomly oriented* crystallographic structure, a sound bond could, quite unexpectedly, be obtained between beryllium oxide and the graphite. Where a joint was made at an elevated temperature between beryllium oxide and pyrolytic graphite with the bond interface perpendicular to the laminar planes of the molecules, it is thought that, due to the large differences in the thermal expansion between the materials (graphite>beryllium oxide), as the materials cooled down the beryllium oxide would be under compression and the graphite under tension; thus, due to the low tensile strength of graphite in this direction (see table), the residual stresses were sufficiently large to cause the joint to fail. Further, where a joint between the two materials was made in the other direction, i.e., interface parallel to the laminar planes, the bonding material, such as platinum, did not diffuse significantly into the graphite and the bond failed at the platinum-graphite interface. However, when graphite which had a randomly oriented crystallographic structure was used a sound metallurgical joint was produced having a tensile strength at least as great as that of the graphite.

The beryllium oxide used was supplied by Brush Beryllium Company under the code UOX and was cold pressed and sintered to a theoretical density of 97%. The graphite used was a nuclear grade supplied by the National Carbon Company under the code C-18. This graphite, which has similar mechanical properties of National Carbon's ATJ graphite, is made by molding and has a slight preferred orientation perpendicular to the applied load during pressing. The relevant mechanical properties of these materials (along with those of pyrolytic graphite), are shown in the table below.

TABLE

| Material | Crystallographic Orientation | Compressive Strength, lbs./in.$^2$ | Tensile Strength, lbs./in.$^2$ |
|---|---|---|---|
| Beryllium oxide | Random | 114,000 | 8,500 |
| Pyrolytic graphite | Perpendicular to laminar planes. | 51,000 | Very Small. |
| Do | Parallel to laminar planes. | 48,000 | 20,000 |
| C-18 graphite | Random [1] | 8,270 | 1,790 |
| Do | Random [2] | 8,540 | 1,430 |

[1] Slightly oriented with the grain.
[2] Slightly oriented across the grain.

Although not critical, it is preferred that the platinum metal, which is used as an interfacial diffusant, be in the form of a thin foil approximately 4 mils thick and completely cover the contacting surfaces of the two materials to be joined.

The heating step may be carried out in any suitable furnace, such as a graphite resistance furnace, with the heating period varying with the temperature used. Applicant has found that, while not critical to the practice of the invention, the heating period should best be at least 48 hours in duration, and under a vacuum of about 20 microns of mercury. While the rate at which the materials are heated is not critical, it has been found that the rate at which the materials, after bonding, are cooled to ambient temperature should be at a sufficiently slow rate to minimize stresses induced by the differential contraction of the bonded material.

Further illustration of the quantitative aspects and procedures of the present invention is provided in the following examples.

*Example I*

A UOX grade beryllium oxide was made into a pellet (½" diameter x ¼" high) by cold-pressing and sintering at 1750° C. for 3 hours. A random oriented graphite (National Carbon's C-18 type graphite) coupon (⅝" x ⅝" x ¼") was recessed ⅛" deep on one face to permit insertion of the beryllium oxide pellet. A platinum foil 0.004" in thickness and ½" in diameter was placed in the recess between the graphite and the beryllium oxide.

The sample was placed in a graphite resistance furnace and heated in a vacuum of 20 microns of mercury for 48 hours at 1600° C. Then, the sample was cooled slowly at a rate of 30°/min. from 1600° C. down to 1400° C. and thereafter cooled at a rate of 80°/min. to room temperature.

Qualitative tests indicated that the tensile strength of the bond was at least as great as that of the graphite ($\sim$1,430 lbs./in.$^2$).

Visual and photomicrographic inspection revealed that the platinum foil had not melted during the experiment, but had diffused into both the graphite and beryllium oxide.

*Example II*

Five additional samples were prepared as described in Example I and experiments were run varying the heating time and temperature. Satisfactory bonds were obtained by compensating time and temperature of reaction between 40 hours at 1650° C. and 60 hours at 1550° C.

Qualitative tests indicated that the tensile strength of the bond was at least as great as that of the graphite ($\sim$1,430 lbs./in.$^2$).

It is to be understood that the foregoing examples are merely illustrative and are not intended to limit the scope of this invention, but the invention should be limited only by the scope of the appended claims.

What is claimed is:

1. A method for bonding a beryllium oxide body to a body of graphite having a randomly oriented crystallographic structure which comprises the steps of disposing selected surfaces of said beryllium oxide body and said graphite body in abutting relationship, interposing a thin layer of platinum metal therebetween said selected surfaces, heating said abutting surfaces in a vacuum to a temperature above 1500° C. but below 1773° C. for a sufficient length of time to cause diffusion of the platinum into said bodies to bond said abutting surfaces together and thereafter slowly cooling the bonded joint to ambient temperature.

2. The method of claim 1 wherein said platinum metal is a 0.001" metal foil.

3. The method of claim 1 wherein said heating step is carried out at a temperature within the range of 1550° C.–1650° C. for at least 48 hours.

References Cited by the Examiner

UNITED STATES PATENTS 2,264,152  11/1941  Rowland.
3,078,564  2/1963  Bourdeau _____ 29—498

JOHN F. CAMPBELL, *Primary Examiner.*